United States Patent [19]

Blosser

[11] 4,126,211
[45] Nov. 21, 1978

[54] CABLE REEL RESTRAINING APPARATUS

[75] Inventor: Carl J. Blosser, Normal, Ill.

[73] Assignee: GTE Automatic Electric Laboratories Incorporated, Northlake, Ill.

[21] Appl. No.: 846,868

[22] Filed: Oct. 31, 1977

[51] Int. Cl.² .................................................. B60T 3/00
[52] U.S. Cl. ............................... 188/32; D12/217; 105/463; 105/468; 248/119 R; 280/179 R
[58] Field of Search .............. 188/32, 36; 105/368 R, 105/368 T, 463, 486, 367; 254/150 R; 280/179 R; 248/119 R, 510, 500, 506; 70/18, 225, 226, 228; D12/217; 242/68.7; 269/249

[56] References Cited

U.S. PATENT DOCUMENTS

| 340,880 | 4/1886 | Johnson | 188/32 |
|---|---|---|---|
| 1,445,071 | 2/1923 | Collins | 188/32 |
| 2,311,042 | 2/1943 | Ferguson | 269/249 |
| 2,519,107 | 8/1950 | Brown | 269/249 |
| 2,735,462 | 2/1956 | Olsen | 269/249 |
| 2,992,704 | 7/1961 | Showker et al. | 188/32 |
| 3,715,993 | 2/1973 | Orlik | 105/486 |
| 4,031,983 | 6/1977 | Lentini | 188/32 |

Primary Examiner—Edward R. Kazenske
Attorney, Agent, or Firm—Robert J. Black

[57] ABSTRACT

A restraining apparatus used to secure cable reels during transportation or storage wherein a restraining device is inserted between a flange of a cable reel and a supporting surface and an associated clamp is pivoted and tightened onto the flange securing the apparatus in position.

6 Claims, 3 Drawing Figures

CABLE REEL RESTRAINING APPARATUS

BACKGROUND OF THE INVENTION

1. Field of the Invention

This invention relates to cable reels, and more particularly to apparatus for restraining movement of cable reels during transportation or storage.

2. Description of the Prior Art

Presently, cable for the transmission of electrical current or signals is stored and delivered for installation on a job site in heavy and awkward spools or reels. Typically these reels are loaded and delivered to a particular job site in trucks or vans. Since the reels are circular in structure, road vibrations or any other movements inherent in transport may set the reels in motion, therefore some method of securing them must be used in order to avoid the reels from rolling into each other and causing physical damage to the cable.

Additionally, it is desirable in many instances to secure cable reels during storage at warehouses or at various job sites. Typically, fully loaded reels weigh between 300 lbs. to 2700 lbs. depending upon the diameter and width of the reel and the weight of the cable. This tremendous weight in combination with the inherent rolling characteristics of the reel may pose a serious danger to cables, equipment and personnel when a perfectly flat storage site cannot be provided.

In the past, several methods have been used to secure cable reels for transport.

One method used, is to secure the reels with nylon straps hooked to a trucks wall or bed. This method has proven to be ineffective since straps can either break or loosen, causing shifting in the load and consequently the spilling of the load onto public thoroughfares. Another procedure used is butting flanges of two different reels together securing the last reel with tire chocks. This method is not always possible since reels may vary in width and flanges consequently will not match. Still another method is to nail large wooden blocks to the truck bed to hold reels in place. This procedure is the safest method to prevent shifting, but consequently, large spikes are needed to hold these blocks in place and after a period of use and removal they severely damage the truck bed. This is also time consuming, needing at least 5 minutes to position the reel and nail down the blocks.

During storage or at a job site, reels are usually secured using tire chocks or blocks of wood which by accident or thru neglect may work loose causing the reel to roll if the surface it is resting on is not perfectly flat, thus again increasing the risk of damage or injury.

Accordingly, it is the object of the present invention to provide a restraint apparatus for safely and efficiently securing cable reels during transport or storage.

SUMMARY OF THE INVENTION

Typically a cable reel is comprised of two parallel circular flanges of a large diameter and a cylinder mounted horizontally between the flanges with the cylinders outer circumference concentric to the circumference of the flanges.

Cable is wound around the cylinders outer circumference to a depth where it is protected from damage by the outer edges of the flanges.

Typical cable reels of the type to which the invention may be applied range in size between 2 feet to 10 feet in diameter and 2 feet to 6 feet in width, their weight fully loaded is relative to the type and weight of cable stored. For example, a reel 5 feet in diameter with approximately 500 feet of 500MCM telephone cable would weigh 1600 lbs.

The reels when loaded are stored and transported with both flanges resting on a flat supporting surface facilitating short distance movement by rolling them around the outer circumference of the flanges.

In accordance with the present invention, there is provided a restraining element generally rectangular in shape including a truncated portion adapted to be inserted under one of the cable reel flanges forming a tangent under the flange with a bottom portion of the restraining element resting on a flat supporting surface. The restraining element may be fashioned from wood, metal, or any similar rigid and inflexible material. The bottom portion is clad with a treated rubber or abrasive material to minimize slippage and to provide a secure frictional bond on the supporting surface. The restraining element further includes a rotatable pin hinge with a C-shaped clamp mounted to one end of the hinge, arranged to be secured to the reel flange.

The cable reel restraining apparatus of the present invention is typically installed in the following manner: The cable reel is rolled and positioned onto a truck bed, storage area or any other flat supporting surface and the restraining apparatus is inserted with the truncated portion under and in contact with one of the flanges while the bottom portion rests on the supporting surface. The clamp is then pivoted to a convenient point and tightened on the flange thus securing the restraining element and preventing the restraining apparatus from working loose. A similar cable reel restraining apparatus is placed and secured on the opposite side of the same flange or adjoining flange, thus preventing either fore or aft movement of the cable reel.

The weight of the reel produces a force against the restraining element's truncated portion which in turn is distributed to the bottom portion. The rubber or abrasive material which the bottom portion is clad with, is compressed against the supporting surface causing a frictional bond between the surfaces, consequently the greater the weight of the reel, the stronger the frictional bond. The clamp when tightened against the flange maintains the restraining apparatus in position at all times limiting the danger of the apparatus working loose. It takes approximately 7 seconds to secure a reel using the apparatus of the present invention.

BRIEF DESCRIPTION OF THE DRAWINGS

A better understanding of the invention may be had from a consideration of the following detailed description taken in conjunction with the accompanying drawings in which.

DESCRIPTION OF THE PREFERRED EMBODIMENT

Figure 1:
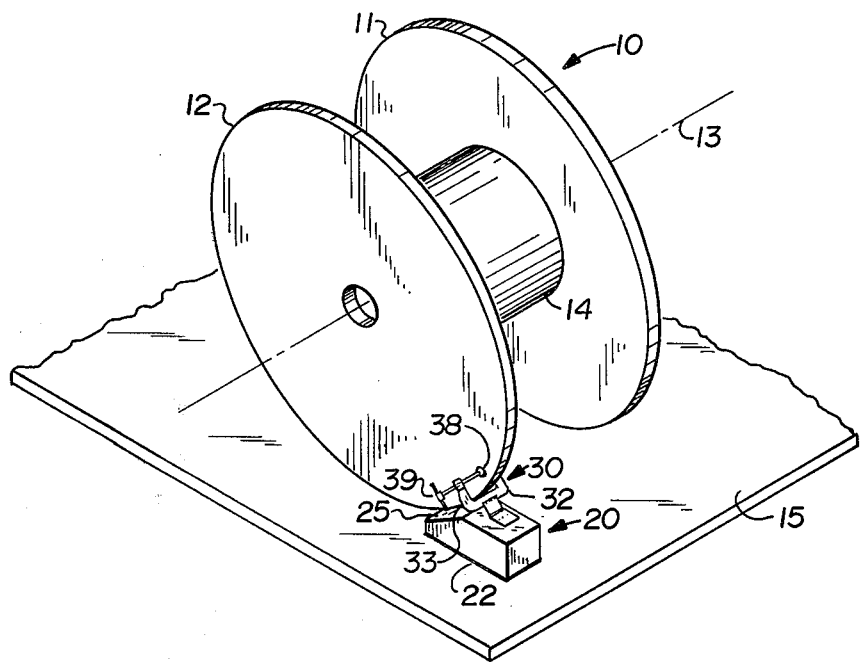
FIG. 1 is a perspective view, of a typical cable reel using cable reel restraining apparatus in accordance with the present invention.

Referring now to the accompanying drawings of the present invention, FIG. 1 illustrates as the environment a cable reel 10 of the type to which the invention may be applied. The cable reel 10 includes two spaced apart and parallel circular flanges 11 and 12, of a large diameter disposed to rotate around a horizontal central axis 13 and a cylinder 14, of a smaller diameter rigidly mounted horizontally between the flanges 11, 12 with the cylinders 14 outer circumference concentric to the circumference of the flanges. The flanges 11, 12 rest on a planar ground surface 15 with the central axis 13 parallel to the ground surface 15. A cable reel chock restraining element 20 is shown in position under flange 12 with the C-shaped clamp 30 securing the restraining element to flange 12. It should be understood that other cable reel restraining apparatus may be inserted under any end of each of the flanges 11, 12.

Figure 2:
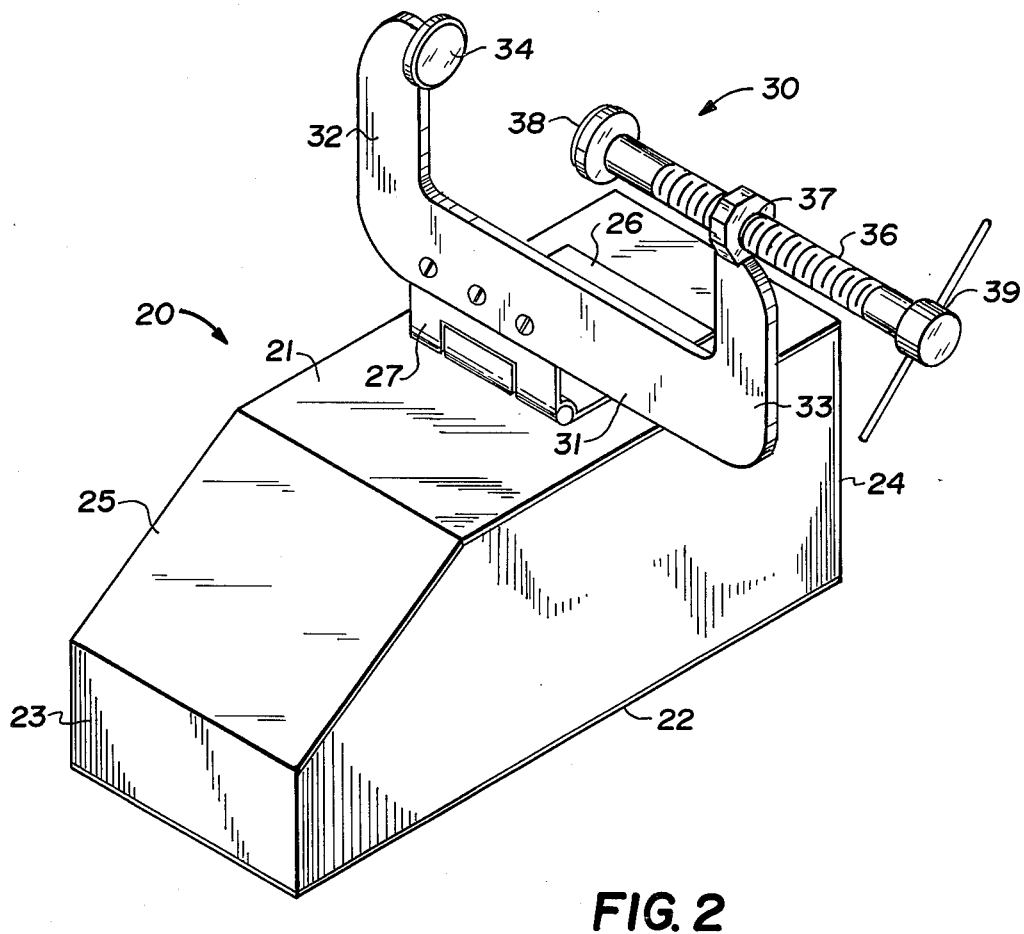
FIG. 2 is a detailed perspective view of the cable reel restraining apparatus shown generally in FIG. 1.

Turning now to FIG. 2, a cable reel restraining apparatus in accordance with the principles of this invention is illustrated.

The assembly comprises a restraining element 20 and a C-shaped clamp 30.

The restraining element 20 is comprised of a plurality of surfaces, including a generally planar spaced apart and parallel top surface 21 and bottom surface 22, between first and second spaced apart and parallel end surfaces 23, 24, respectively. The first end surface 23 further includes a planar truncated surface 25 longitudinally oriented between a portion of the first end surface 23 and a portion of the top surface 21. The restraining element 20 may be fashioned from wood, metal or similar rigid and inflexible material, limited only to having its truncated surface 25 and top surface 21 constructed of such a material as to prolong its life and to prevent damage by the cable reels. Further, the bottom surface 22 is clad with treated rubber or abrasive material to minimize slippage.

The restraining element 20 further includes a rotatable pin hinge with a first leaf 26 mounted on the top surface 21 of the restraining element and a second leaf 27 mounted longitudinally to a bottom portion 31 of the C-shaped clamp 30.

The C-shaped clamp 30 as viewed from the rear is comprised of an upstanding right side and left side portion 32, 33, respectively, on either end of a horizontal bottom portion 31. The right side portion 32 includes an inwardly facing abutment surface 34 arranged to engage the right side of one of the cable reel flanges. The left side portion 33 includes a horizontally oriented clamp screw 36 having a fitted portion carried in a mating horizontal threaded bore 37, the clamp screw further includes, a fixed inwardly facing abutment surface 38 on an inner end and a T-shaped member 39 fixed to an outer end. The left side abutment surface 38 is arranged to engage a left side of the cable reel flange.

Referring now to FIG. 1, the cable reel restraining apparatus is installed in the following manner. The cable reel 10 is rolled and positioned on a truck bed or storage location shown as ground surface 15 and the restraining apparatus is inserted with the truncated surface 25 under one of the flanges 12 while the bottom surface 22 rests on the ground surface 15. The truncated surface 25 forms a tangent under cable reel flange 12, preventing rolling motion of cable reel 10 when a force is applied perpendicular to the tangent. The clamp 30 is then pivoted to a convenient point on flange 12 and the right side abutment surface 34 (not shown) is positioned against the right side of flange 12. The left side abutment surface 38 engages the left side of cable reel flange 12 to secure the clamp 30 to the flange when the T-shaped member 39 is rotated to apply a horizontal compressive force between the left and right abutment surfaces 38 and 34, respectively. Both abutment surfaces 38, 34 are clad with rubber or any other resilient compressible material to provide for a secure bite on the reel flange.

Figure 3:
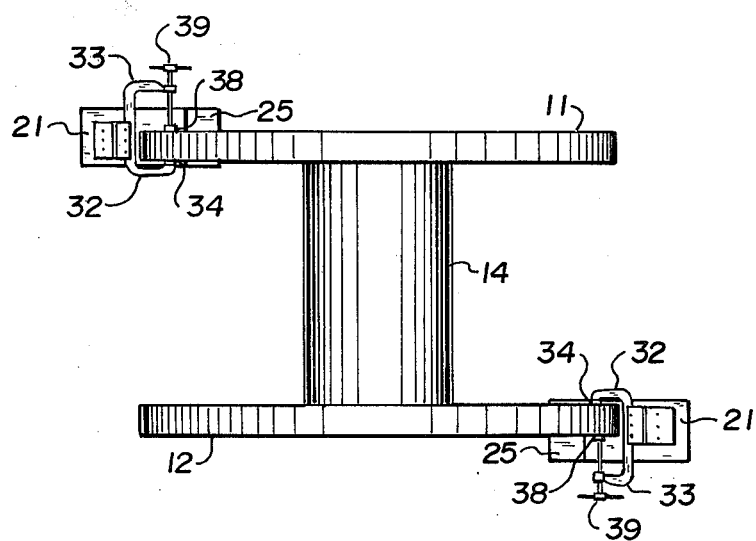
FIG. 3 is a top view of a typical cable reel using two cable reel restraining apparatus in accordance with the present invention.

A similar cable reel restraining apparatus may be placed and secured in the same manner described on the opposite end of the same flange or on the opposite end of an adjoining flange thus preventing either fore or aft movement of the cable reel as shown in FIG. 3.

The present invention has been described with reference to a specific embodiment thereof, for the purpose of illustrating the manner in which the invention may be used to advantage, it will be appreciated by those skilled in the art that the invention is not limited thereto. Accordingly, any and all modifications, variations, or equivalent arrangements which may occur to those skilled in the art should be considered to be within the scope of the invention.

What is claimed is:

1. A cable reel restraining apparatus to be used with a cable reel including at least two circular flanges, resting on a supporting surface comprising:

a chock restraining element with a plurality of surfaces including a generally planar spaced apart and parallel top surface and bottom surface, located between first and second spaced apart and parallel end surfaces, said first end surface further including a planar truncated surface longitudinally oriented between a portion of said first end surface and a portion of said top surface;

clamping means rotatably mounted on said top surface of said restraining element by a freely pivoting pin hinge with a first leaf mounted on said top surface of said restraining element and a second leaf mounted on said clamping means disposed to secure said restraining element to a circular flange of said cable reel when said restraining element's truncated surface is engaged with said flange to form a tangent therewith and said bottom surface is resting on said supporting surface, whereby rolling motion of said cable reel is prevented when a force is applied perpendicular to said tangent.

2. A cable reel restraining apparatus as recited in claim 1, wherein: said bottom surface of said restraining element is clad with a resilient compressible material.

3. A cable reel restraining apparatus as recited in claim 1, wherein: said bottom surface of said restraining element is clad with an abrasive material.

4. A cable reel restraining apparatus as recited in claim 1, wherein: said restraining elements top surface and truncated surface are constructed of a rigid and inflexible material.

5. A cable reel restraining apparatus as recited in claim 1, wherein: said clamping means comprises a C-shaped member having a horizontal bottom portion mounted to said second leaf of said pin hinge and an upstanding first side and second side portion, said first side portion includes an inwardly facing abutment surface disposed to engage a side of said cable reel flange, said second side portion includes a horizontally oriented clamp screw having a threaded portion carried in a mating horizontal threaded bore, said clamp screw further includes a fixed inwardly facing abutment surface on an inner end parallel to and in direct opposition of said first side abutment surface and a T-shaped member rotatable to apply a horizontal compressive force, fixed to an outer end; said second side abutment surface disposed to engage an opposite side of said cable reel flange and to secure said clamp to said cable reel flange; and said T-shaped member rotatable to apply force between said abutment surfaces.

6. A cable reel restraining apparatus as recited in claim 5, wherein: said abutment surfaces are clad with a resilient compressible material.

* * * * *